United States Patent
Abe

(10) Patent No.: US 8,824,746 B2
(45) Date of Patent: Sep. 2, 2014

(54) BIOMETRIC INFORMATION PROCESSING DEVICE, BIOMETRIC-INFORMATION PROCESSING METHOD, AND COMPUTER-READABLE STORAGE MEDIUM

(75) Inventor: Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 13/450,750

(22) Filed: Apr. 19, 2012

(65) Prior Publication Data

US 2013/0028488 A1 Jan. 31, 2013

(30) Foreign Application Priority Data

Jul. 29, 2011 (JP) .................. 2011-166957

(51) Int. Cl.
 G06K 9/62 (2006.01)
 G06K 9/00 (2006.01)
 G06K 9/03 (2006.01)
(52) U.S. Cl.
 CPC .............. G06K 9/0008 (2013.01); G06K 9/036 (2013.01)
 USPC ........... 382/115; 382/124; 382/125; 382/128; 382/132; 382/118
(58) Field of Classification Search
 CPC .............. G07C 9/00158; G06T 7/0012; G06T 2207/10116; G06K 9/0002; G06K 9/00067
 USPC .................. 382/115, 124–125, 128, 132, 118
 See application file for complete search history.

(56) References Cited

U.S. PATENT DOCUMENTS 5,963,656 A 10/1999 Bolle et al.
6,005,963 A 12/1999 Bolle et al.

(Continued)

FOREIGN PATENT DOCUMENTS

| JP | 04-324582 | 11/1992 |
| JP | 9-282458 | 10/1997 |
| JP | 2007-272568 | 10/2007 |
| JP | 2008-310814 | 12/2008 |

OTHER PUBLICATIONS

Yi Wang, et al., "A Fingerprint Orientation Model Based on 2D Fourier Expansion (FOMFE) and Its Application to Singular-Point Detection and Fingerprint Indexing", IEEE Transactions on Pattern Analysis and Machine Intelligence, vol. 29, No. 4, pp. 573-585, Apr. 2007.

(Continued)

Primary Examiner — Ruiping Li
(74) Attorney, Agent, or Firm — Staas & Halsey LLP

(57) ABSTRACT

An biometric-information processing device includes a biometric-information acquiring unit that generates a biometric image representing biometric information on a surface of a specific portion of a user; a divider that divides the biometric image into multiple blocks; a prior-complexity-degree estimator that estimates, for each of the multiple blocks, a prior complexity degree indicating complexity of a pattern of part included in the biometric information and represented in the block, on a basis of a difference between a direction of the pattern of the part included in the biometric information and represented in the block and a direction of a pattern of other part included in the biometric information and represented in the block adjacent to that block; a posteriority-complexity-degree determiner that determines, for each of the multiple blocks, a posterior complexity degree indicating complexity of an image of the part included in the biometric information and represented in the block.

15 Claims, 10 Drawing Sheets

(56) References Cited

U.S. PATENT DOCUMENTS

| | | | |
|---|---|---|---|
| 2003/0076986 A1* | 4/2003 | Yoon et al. | 382/125 |
| 2006/0120575 A1* | 6/2006 | Ahn et al. | 382/124 |
| 2008/0310691 A1 | 12/2008 | Yun et al. | |

OTHER PUBLICATIONS

Anil K. Jain et al., "Filterbank-Based Fingerprint Matching", IEEE Transactions on Image Processing, vol. 9, No. 5, May 2000, pp. 846-859.

Nalini K. Ratha et al., "Adaptive Flow Orientation-Based Feature Extraction in Fingerprint Images", Pattern Recognition, vol. 28, No. 11, 1995, pp. 1657-1672.

Anil Jain et al., "On-Line Fingerprint Verification", IEEE Transactions on Pattern Analysis and Machine Intelligence, vol. 19, No. 4, Apr. 1997, pp. 302-313.

Anil Jain et al., "Fingerprint Classification and Matching", Handbook of Image and Video Processing, 2000, pp. 821-835.

Extended European Search Report issued Oct. 9, 2012 in corresponding European Patent Application No. 12166352.0.

* cited by examiner

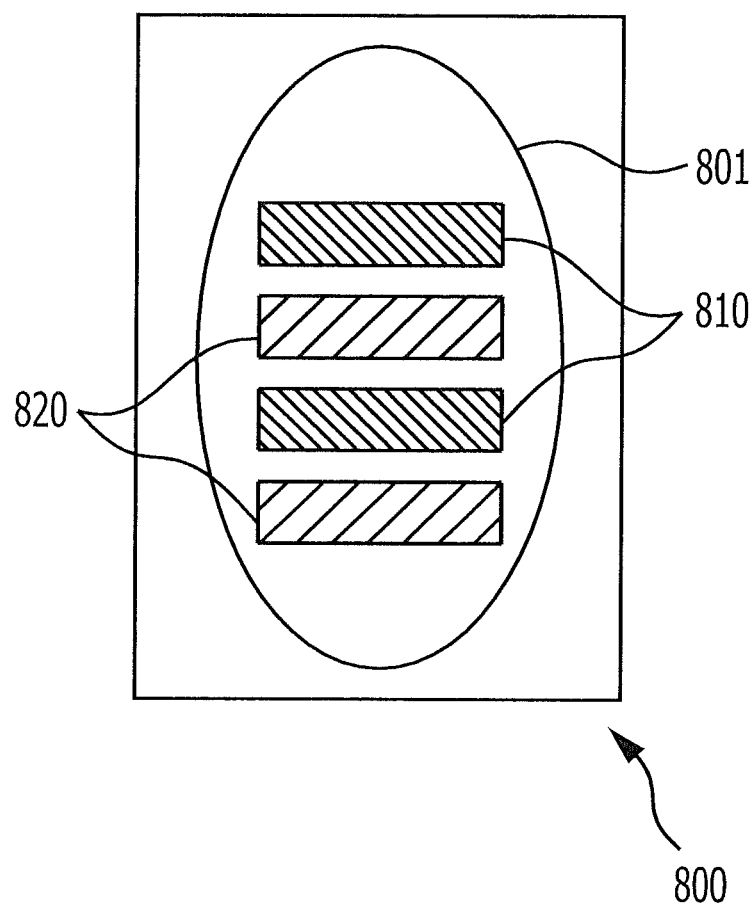

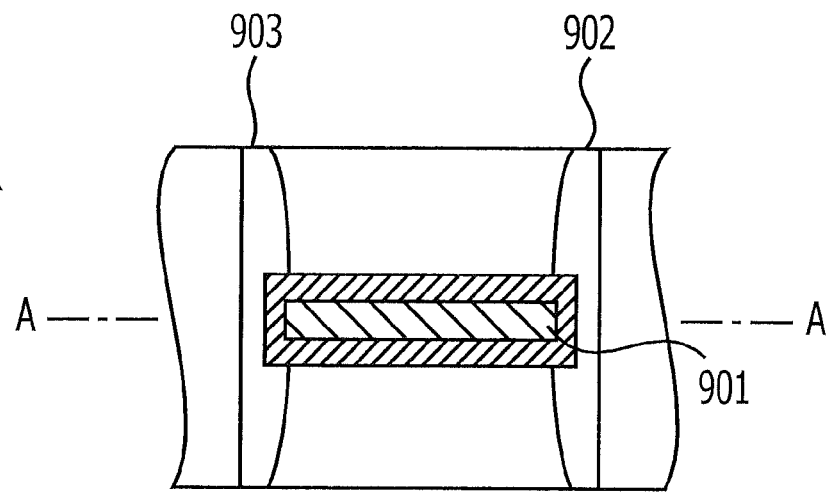
FIG. 9A
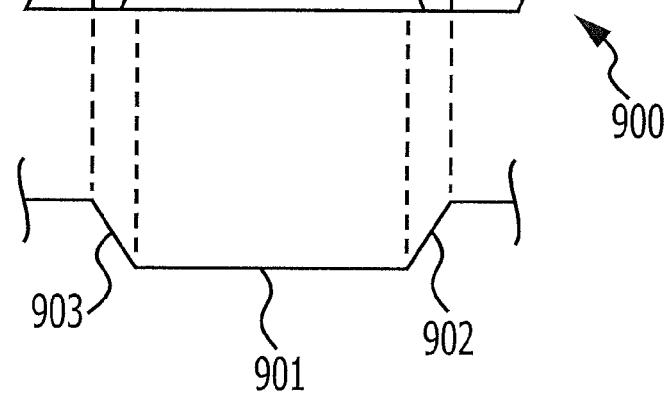
FIG. 9B
FIG. 9C
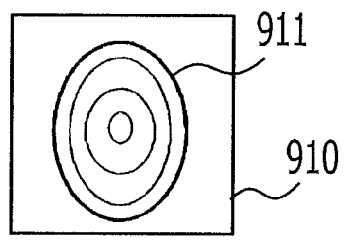
FIG. 9D
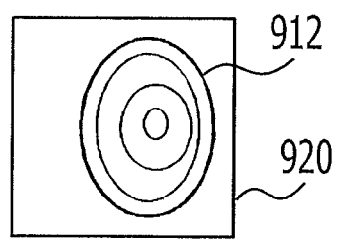

BIOMETRIC INFORMATION PROCESSING DEVICE, BIOMETRIC-INFORMATION PROCESSING METHOD, AND COMPUTER-READABLE STORAGE MEDIUM

CROSS-REFERENCE TO RELATED APPLICATION(S)

This application is based upon and claims the benefit of priority of the prior Japanese Patent Application No. 2011-166957, filed on Jul. 29, 2011, the entire contents of which are incorporated herein by reference.

FIELD

The embodiments discussed herein are related to a biometric-information processing device and a biometric-information processing method for detecting a distortion in biometric information represented in an image and a computer-readable recording medium storing a computer program for biometric information processing.

BACKGROUND

Recent years have seen the development of biometric authentication technology for determining whether or not to authenticate individuals by using biometric information, such as fingerprints or palmprints. The biometric authentication technology has been widely used ranging from large-scale systems for a large number of registered users, such as a border control system and a system using citizen identification numbers, to specific-personal-use apparatuses, such as computers and mobile terminals.

For example, when the fingerprint of any finger is used as biometric information, a biometric authentication device acquires, as an input biometric image, a biometric image representing the fingerprint. The biometric authentication device compares the input biometric information, which is the user's fingerprint represented in the input biometric image, with registered biometric information, which is a fingerprint represented in a biometric image of a registered user. Upon determining that the input biometric information and the registered biometric information match each other on the basis of a result of the comparison processing, the biometric authentication device authenticates the user as a registered user having a legitimate right. The biometric authentication device permits the authenticated user to use an apparatus in which the biometric authentication device is incorporated or another apparatus connected with the biometric authentication device.

When a sensor reads biometric information (such as a fingerprint or palmprint) found on the surface of a specific portion of the human body, there are cases in which part in the biometric information is distorted by the condition or characteristics of the surface of the portion of the user or motion of the portion during the reading. For example, when the user excessively presses his or her finger against the sensor, fingerprint ridges are flattened to cause distortion in the fingerprint represented in the biometric image. Thus, when a biometric image representing partly distorted biometric information is used for biometric authentication, the biometric authentication device may fail to accurately extract features of the biometric information. This may result in a decline in the authentication accuracy.

Accordingly, there is a proposed technology for detecting and/or correcting a distortion in biometric information in a biometric image.

For example, Japanese Laid-open Patent Publication No 2007-272568 discloses a technology in which a group of feature points selected from one of two pieces of feature information and feature points included in the other one of the two pieces of feature information and corresponding to the selected feature points is set as position-alignment candidates and the amount of position correction with which pieces of position information of the feature points in the group generally match each other is determined.

Japanese Laid-open Patent Publication No. 04-324582 discloses a technology in which the amount of position correction is determined based on the number of comparisons and the amount of position displacement between a fingerprint obtained during registration and a fingerprint obtained during each of the comparisons.

In addition, Japanese Laid-open Patent Publication No. 09-282458 discloses an image verification device that aligns an input image of a fingerprint with a reference image after correcting a geometric distortion in the input image. This image verification device determines a reference position in a block of interest in an input image on the basis of the distance between the image center of the input image and the block of interest and determines correlations with the input image while displacing, in the reference image, influence blocks corresponding to the block of interest. The image verification device then corrects the reference position by using the amount of displacement of the influence block having the largest correlation.

Additionally, Japanese Laid-open Patent Publication No. 2008-310814 discloses a technology in which a deformable mesh is constructed with respect to a first fingerprint feature point and the state of the deformable mesh is transformed to obtain a distortion-compensated first fingerprint, and the distortion-compensated first fingerprint is compared with a second fingerprint.

SUMMARY

According to an aspect of the embodiment, a biometric-information processing device includes a biometric-information acquiring unit that generates a biometric image representing biometric information on a surface of a specific portion of a user; a divider that divides the biometric image into multiple blocks; a prior-complexity-degree estimator that estimates, for each of the multiple blocks, a prior complexity degree indicating complexity of a pattern of part included in the biometric information and represented in the block, on a basis of a difference between a direction of the pattern of the part included in the biometric information and represented in the block and a direction of a pattern of other part included in the biometric information and represented in the block adjacent to that block; a posteriority-complexity-degree determiner that determines, for each of the multiple blocks, a posterior complexity degree indicating complexity of an image of the part included in the biometric information and represented in the block, on a basis of features indicating a complexity degree of an image represented in the block; an a distortion detector that detects the block having a difference between the posterior complexity degree and the prior complexity degree as a distorted block in which the part included in the biometric information and represented in the block has distortion, by comparing the posterior complexity degree with the prior complexity degree for each of the multiple blocks.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 8 illustrates one example of distribution of increased-complexity-degree blocks and reduced-complexity-degree blocks detected from a biometric image when a finger surface gets stuck on a swipe fingerprint sensor multiple times;

FIG. 9A is a schematic plan view of a swipe fingerprint sensor having guiding members, FIG. 9B illustrates a cross section taken along a dotted line A in FIG. 9A, FIG. 9C is a schematic view of a biometric image obtained when a finger is moved with the finger being aligned at substantially the center of the swipe fingerprint sensor; and FIG. 9D is a schematic view of a biometric image obtained when the finger is moved with the finger being pressed against the guiding member at the right side of the swipe fingerprint sensor.

DESCRIPTION OF EMBODIMENTS

A biometric-information processing device according to embodiments will be described below with reference to the accompanying drawings.

The biometric-information processing device divides a biometric image representing a user's biometric information, obtained during registration or comparison of the biometric information, into multiple blocks. The biometric-information processing device estimates, for each block, a prior complexity degree indicating inherent complexity of the biometric information in the block, on the basis of changes in a pattern in the block relative to patterns in the blocks adjacent thereto. The biometric-information processing device further determines, for each block, a posterior complexity degree indicating complexity of an image of part included in the biometric information and represented in the block, on the basis of features indicating a complexity degree of an image represented in the block. The biometric-information processing device further detects a distortion in the biometric information in the biometric image by detecting a block having a difference between the posterior complexity degree and the prior complexity degree as a block in which the complexity degree was changed by various posterior factors, such as finger motion during acquisition of the biometric image.

In the present embodiment, the biometric-information processing device uses a fingerprint of any of the fingers as biometric information to be subjected to biometric authentication. However, the biometric information to be subjected to the biometric authentication may be other biometric information that is found on a surface of any portion of the human body. One example of the other biometric information is a palmprint.

The term "comparison processing" herein refers to processing for determining an index indicating a degree of difference or a degree of similarity between biometric information of a user and biometric information of a registered user. The term "biometric authentication processing" refers to not only the comparison processing but also overall authentication processing including processing for determining whether or not to authenticate the user by using the measure obtained by the comparison processing.

Figure 1:
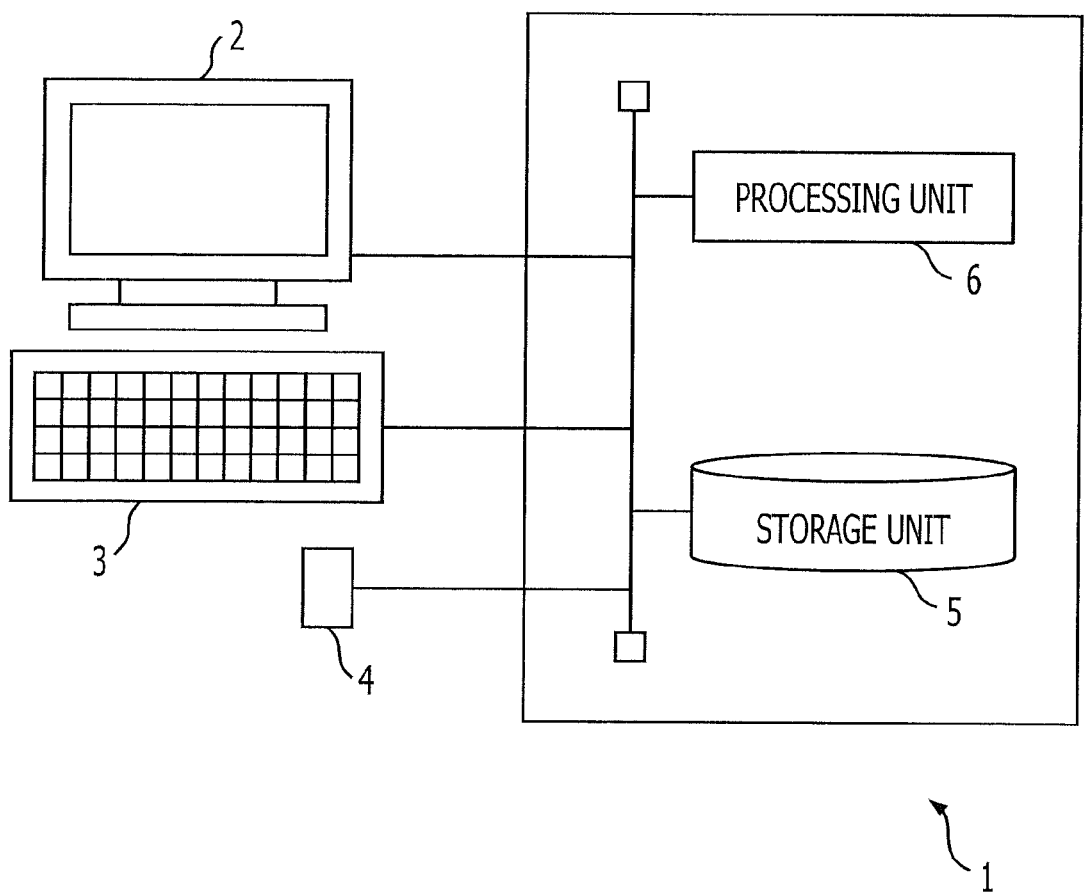
FIG. 1 is a schematic block diagram of a biometric authentication device according to a first embodiment of a biometric-information processing device.

FIG. 1 is a schematic block diagram of a biometric authentication device according to a first embodiment of the biometric-information processing device. As illustrated in FIG. 1, a biometric authentication device 1 includes a display unit 2, an input unit 3, a biometric-information acquiring unit 4, a storage unit 5, and a processing unit 6. The display unit 2, the input unit 3, and the biometric-information acquiring unit 4 may be provided independently from a casing in which the storage unit 5 and the processing unit 6 are accommodated. Alternatively, the display unit 2, the input unit 3, the biometric-information acquiring unit 4, the storage unit 5, and the processing unit 6 may be accommodated in one casing, as in a notebook personal computer or a tablet terminal.

The biometric-information acquiring unit 4 generates a biometric image representing a fingerprint of a user's finger. The biometric authentication device 1 executes biometric authentication processing by comparing the user's fingerprint with registered users' fingerprints. When the result of the biometric authentication processing indicates that the user in question is authenticated as one of the registered users, the biometric authentication device 1 permits the user to use an apparatus equipped with the biometric authentication device 1. Alternatively, the biometric authentication device 1 may transmit a signal indicating that the user is authenticated to another apparatus (not illustrated) to permit the user to use the apparatus.

The display unit 2 includes, for example, a display device, such as a liquid crystal display or an organic electroluminescent display. The display unit 2 displays, to the user, a guidance message for prompting the user to place his or her finger(s) so that the biometric-information acquiring unit 4 can acquire a biometric image having biometric information with a small amount of distortion. The display unit 2 may also display a message indicating the result of the biometric authentication processing executed by the processing unit 6, various types of information associated with application programs, and so on.

The input unit 3 includes, for example, a keyboard, a mouse, and a user interface, such as a touch pad. The user may input user identification information, such as his or her user name, via the input unit 3. Such user identification information, commands, or data may be passed to the processing unit 6. In a case in which the user does not have to input information other than the biometric information to the biometric authentication device 1, the input unit 3 may be omitted.

The biometric-information acquiring unit 4 may include a fingerprint sensor using, for example, an area sensor. The fingerprint sensor may also be implemented by a sensor employing any of an optical system, an electrostatic capacitance system, an electrolytic system, a thermosensitive system, and so on. While the user places his or her finger on a sensor surface of the fingerprint sensor, the biometric-information acquiring unit 4 captures a surface of the finger to generate a biometric image representing a fingerprint thereof.

The fingerprint sensor included in the biometric-information acquiring unit 4 may also be a swipe fingerprint sensor. In such a case, when the user is swiping his or her finger on the fingerprint sensor, the biometric-information acquiring unit 4 sequentially generates partial images at regular time intervals. The partial images represent parts of the fingerprint on the surface of the finger. Thus, the partial images are combined in the order in which the partial images are generated, so that a biometric image representing the entire fingerprint of the finger is created.

Each time a biometric image is generated, the biometric-information acquiring unit 4 passes the biometric image to the processing unit 6.

The storage unit 5 may include at least one of, for example, a semiconductor memory, a magnetic disk device, and an optical disk device. The storage unit 5 stores, for example, the user name, the user identification number, and individual setting information of at least one registered user, as well as an application program used by the biometric authentication device 1 and various types of data. The storage unit 5 also stores a program for executing the biometric authentication processing. With respect to each registered user, the storage unit 5 further stores data regarding a fingerprint of a specific finger (the fingerprint is registered biometric information of the registered user) in conjunction with the registered-user's identification information, such as his or her user name and password. The data regarding the registered biometric information includes, for example, feature information regarding the registered biometric information. The feature information includes, for example, minutia types, minutia positions, and local ridge directions extracted from a registered biometric image, which is a biometric image representing the registered biometric information. Examples of the minutia types include an ending and a bifurcation of a ridge. Alternatively, the data regarding the registered biometric information may be the registered biometric information itself or part of the registered biometric image.

The processing unit 6 has a single or multiple processors and a peripheral circuit therefor. The processing unit 6 detects a distortion in the biometric information represented in the biometric image obtained from the biometric-information acquiring unit 4. When the amount of distortion in the biometric information is small, the processing unit 6 executes the biometric authentication processing or registration processing using the biometric image.

Figure 2:
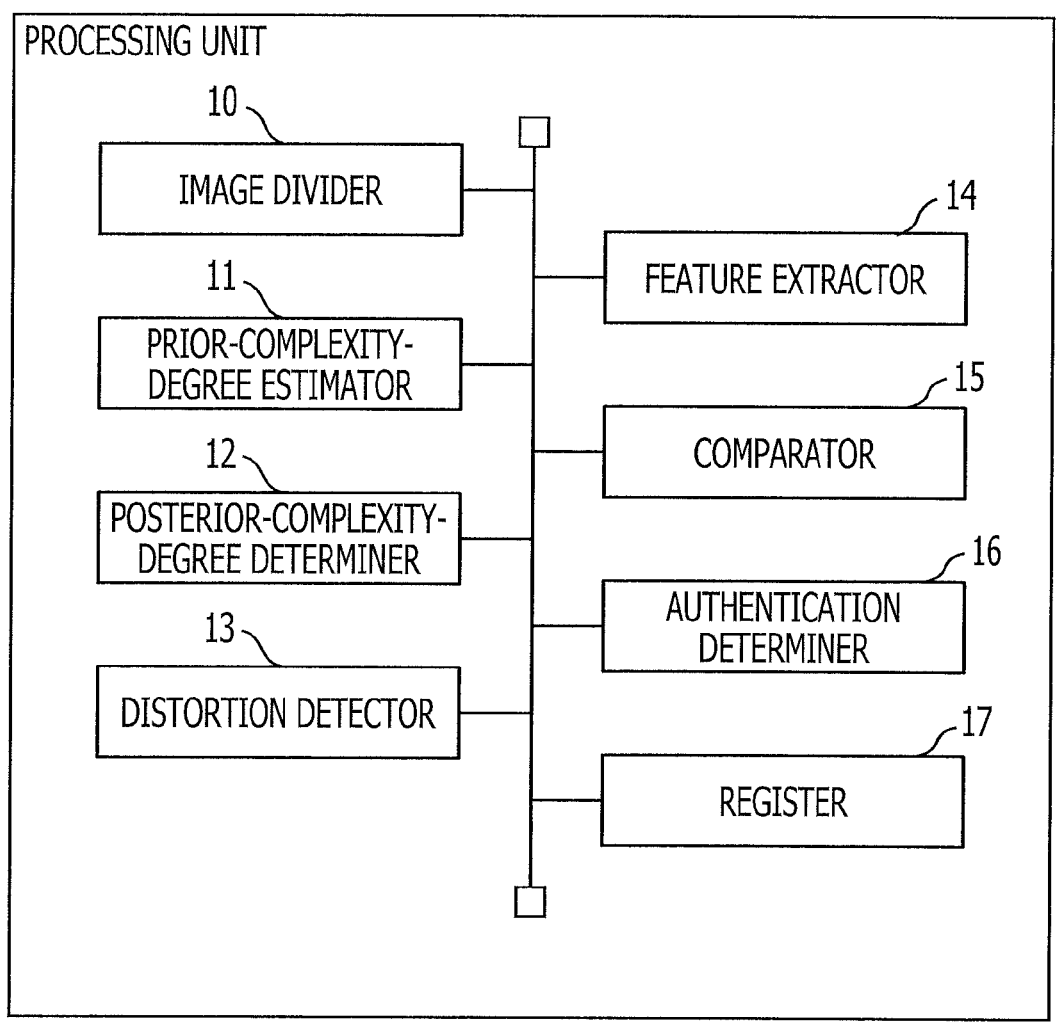
FIG. 2 is a functional block diagram of a processing unit in the first embodiment.

FIG. 2 is a functional block diagram of the processing unit 6. As illustrated in FIG. 2, the processing unit 6 includes an image divider 10, a prior-complexity-degree estimator 11, a posterior-complexity-degree determiner 12, a distortion detector 13, a feature extractor 14, a comparator 15, an authentication determiner 16, and a register 17. Those elements included in the processing unit 6 serve as functional modules, which may be implemented by a computer program executed on a processor included in the processing unit 6. Alternatively, those elements included in the processing unit 6 may be implemented as firmware incorporated into the biometric authentication device 1.

The image divider 10, the prior-complexity-degree estimator 11, the posterior-complexity-degree determiner 12, the distortion detector 13, and the feature extractor 14 are used for both of the biometric authentication processing and the registration processing. The comparator 15 and the authentication determiner 16 are used for the biometric authentication processing. The register 17 is used for the registration processing.

The image divider 10 divides the biometric image, received from the biometric-information acquiring unit 4, into multiple blocks. In the present embodiment, the image divider 10 divides the biometric image into M×N blocks in a lattice (M indicates the number of blocks in the horizontal direction, N indicates the number of blocks in the vertical direction, and M and N are integers 2 or greater) so that each block has a rectangular shape and has longitudinal and lateral dimensions that are twice to ten times the width of a typical ridge. The image divider 10 notifies the prior-complexity-degree estimator 11 and the posterior-complexity-degree determiner 12 about information indicating the positions of the blocks. Examples of the information include the coordinates of inter-block boundaries and the coordinates of the upper left edge and the lower right edge of each block.

The prior-complexity-degree estimator 11 estimates, for each block, a prior complexity degree indicating the complexity of the pattern of the part included in the fingerprint and represented in the block.

In general, the closer to the whorl center of a fingerprint, the smaller the radius of curvature of a ridge of the fingerprint is. Thus, the block that is closer to the whorl center of the fingerprint has a larger degree of change in the ridge direction relative to the ridge direction in the block adjacent to that block. On the other hand, the block that is farther from the whorl center or a singular point, such as a delta, of a fingerprint has a smaller degree of change in the ridge direction relative to the ridge directions in the blocks adjacent to that block. Such a ridge-direction characteristic indicates the inherent complexity of a pattern in biometric information, such as a fingerprint. Even when a fingerprint included in a block of interest is distorted, the ridge direction itself does not change greatly and thus the influence that the distortion in the biometric information in the biometric image has on the degree of change in the ridge direction relative to the ridge directions in the blocks adjacent to the block of interest is small.

Accordingly, the prior-complexity-degree estimator 11 determines a ridge direction, which is the direction of a pattern in the biometric information, for each block and estimates the prior complexity degree for each block on the basis of changes in the ridge direction in the block relative to the ridge directions in the blocks adjacent thereto.

The prior-complexity-degree estimator 11 determines a ridge direction for each block. To this end, for example, with respect to the pixels in each block, the prior-complexity-degree estimator 11 determines a horizontal edge strength $g_h(u, v)$ and a vertical edge strength $g_v(u, v)$ by using an edge-detection filter, such as a Sobel filter or Prewitt filter. In this case, u and v denote the horizontal coordinates and vertical coordinates, respectively, of each pixel in the block.

The prior-complexity-degree estimator 11 determines the ridge direction in each block in accordance with:

$$\theta(i, j) = \frac{1}{2}\tan^{-1}\left(\frac{V_y(i, j)}{V_x(i, j)}\right) \quad (1)$$

$$V_x(i, j) = \sum_{u=b(i-1)}^{bi-1} \sum_{v=b(j-1)}^{bj-1} 2G_x(u, v)G_y(u, v),$$

$$V_y(i, j) = \sum_{u=b(i-1)}^{bi-1} \sum_{v=b(j-1)}^{bj-1} G_x^2(u, v)G_y^2(u, v)$$

where i (i=1, 2, ..., M) and j (j=1, 2, ..., N) denote the number of blocks from the left edge of the biometric image and the number of blocks from the upper edge of the biometric image, respectively. Also, b denotes the horizontal dimension and the vertical dimension (i.e., a pixel unit) of each block. Further, $\theta(i, j)$ denotes a ridge direction in the block that is horizontally the ith block from the left edge and vertically the jth block from the upper edge (this block is hereinafter referred to as a "block (i, j)", for convenience of description).

The prior-complexity-degree estimator 11 may also determine a ridge direction for each block by using any of various other methods for ridge-direction determination. For example, the prior-complexity-degree estimator 11 performs frequency transform for each block to check frequency components in various directions and to determine a direction in which the frequency component corresponding to a ridge pitch is the greatest. It can be presumed that the direction in which the frequency component corresponding to a ridge pitch is the greatest is a direction perpendicular to a ridge. Thus, the prior-complexity-degree estimator 11 may use, as a ridge direction, a direction perpendicular to the direction in which the frequency component corresponding to the ridge pitch is the greatest.

There are also cases in which it is difficult to accurately determine a ridge direction in a block in which the ridge is unclear because of a low contrast between the ridge and a valley. Thus, the prior-complexity-degree estimator 11 may correct the ridge direction in the unclear-ridge block on the basis of the ridge directions in other blocks adjacent to that block. For example, the prior-complexity-degree estimator 11 may correct the ridge direction in a block of interest by performing smoothing-filter processing, such as Gaussian filtering and moving-average filtering, with respect to the values of ridge directions in the block of interest and the blocks therearound.

Alternatively, the prior-complexity-degree estimator 11 may correct the ridge direction in each block so that the ridge direction agrees with the flow of the ridge directions in the surrounding blocks, considering the flow of the ridge directions. A method for correcting the ridge direction for each block considering the flow of ridge directions is proposed in, for example, Yi Wang et al., "A Fingerprint Orientation Model Based on 2D Fourier Expansion (FOMFE) and Its Application to Singular-Point Detection and Fingerprint Indexing", *IEEE TRANSACTIONS ON PATTERN ANALYSIS AND MACHINE INTELLIGENCE*, Volume 29, Issue 4, 2007.

Upon determination of the ridge directions in the blocks, the prior-complexity-degree estimator 11 determines, for each block, a difference $\theta'(i, j)$ in the ridge direction in the block from the ridge directions in the blocks adjacent thereto. For example, the difference $\theta'(i, j)$ in the ridge direction in a block (i, j) may be the largest one of the absolute values of differences between the ridge direction $\theta(i, j)$ in the block (i, j) and the ridge directions $\theta(i+k, j+l)$ in adjacent eight blocks (i+k, j+l) (k, l=−1, 0, 1). Alternatively, the prior-complexity-degree estimator 11 uses, as $\theta'(i, j)$, the average value of the absolute values of differences between the ridge direction $\theta(i, j)$ of the block (i, j) and the ridge directions $\theta(i+k, j+l)$ of adjacent eight blocks (i+k, j+l).

The prior-complexity-degree estimator 11 then determines a prior complexity degree $C_p(i, j)$ for each block in accordance with:

$$C_p(i, j) = \frac{\theta'(i, j)}{\max(\theta'(i, j))} \quad (2)$$

where $\max(\theta'(i, j))$ denotes the largest value of the differences $\theta'(i, j)$ in the ridge directions in the adjacent blocks with respect to all bocks. As is apparent from equation (2), in the present embodiment, the prior complexity degree $C_p(i, j)$ of each block indicates the degree of ridge-direction change normalized with the largest value of the changes in the ridge directions and has a value of 0 to 1.

The prior-complexity-degree estimator 11 passes the prior complexity degree $C_p(i, j)$ of each block to the distortion detector 13.

The posterior-complexity-degree determiner 12 determines, for each block, the posterior complexity degree indicating the complexity of an image of the part included in a fingerprint and represented in the block, on the basis of features indicating a complexity degree of an image represented in the block. For example, the posterior-complexity-degree determiner 12 determines values for the features, on the basis of luminance-value statistics, such as a contrast, a peak frequency, or distribution of luminance values.

The contrast may be determined as a difference between the largest one of luminance values and the smallest one of luminance values in the block. The peak frequency may also be determined as a highest-strength frequency component, other than a zero-order frequency component, of frequency components determined by performing frequency transform, such as Fourier transform, on the block.

The features based on the distribution of luminance values determined with respect to the block may be determined in accordance with:

$$F(i, j) = \frac{1}{1 + \text{Var}(i, j)} \quad (3)$$

where Var(i, j) denotes distribution of the luminance values determined with respect to the block (i, j) and F(i, j) denotes features of the block (i, j). For an unclear-fingerprint block, distinction between a ridge and a valley is unclear and the differences between luminance values of the pixels in the block are small. Consequently, the distribution of the luminance values is also small. Thus, according to equation (3), the value of features increases as the distribution of the luminance values decreases.

Alternatively, the posterior-complexity-degree determiner 12 may determine features of each block on the basis of texture features of the block. Examples of the texture features include entropy or energy. It is, however, preferable that the features have values that increase as the image of a fingerprint represented in the block becomes more complicated.

The posterior-complexity-degree determiner 12 may determine the posterior complexity degree for each block in accordance with:

$$C_a(i, j) = \frac{F(i, j) - F_{min}}{F_{max} - F_{min}} \quad (4)$$

where F(i, j) denotes features determined with respect to the block (i, j). $F_{max}$ and $F_{min}$ denote the maximum value and the minimum value of the features determined with respect to each block. $C_a(i,j)$ denotes the posterior complexity degree of the block (i, j). As is apparent from equation (4), in the present embodiment, the posterior complexity degree $C_a(i, j)$ of each block denotes the degree of block complexity normalized with the features of the block in which the most complicated image is represented, and has a value of 0 to 1.

The posterior-complexity-degree determiner 12 passes the posterior complexity degree $C_a(i, j)$ of each block to the distortion detector 13.

When a fingerprint image in a biometric image is assumed to have no distortion, a block in which the ridge direction changes more greatly has a more complicated image. Thus, a block in which the complexity degree of an image is relatively high and a block in which the complexity degree of a ridge pattern is relatively high are highly likely to be identical.

Accordingly, the distortion detector 13 detects a block having a difference between the prior complexity degree $C_p(i, j)$ and the posterior complexity degree $C_a(i, j)$ as a distorted block in which the part included in the fingerprint and represented in the block has distortion, by comparing the posterior complexity degree $C_a(i, j)$ with the prior complexity degree $C_p(i, j)$ for each block. For example, the distortion detector 13 detects, as an increased-complexity-degree block (i.e., a block in which the complexity-degree is increased by posterior factors, such as finger motion during biometric-image acquisition), a block in which a difference $\Delta(i, j)(=C_a(i, j)-C_p(i, j))$ is larger than or equal to a predetermined threshold α. On the other hand, the distortion detector 13 detects, as a reduced-complexity-degree block (in which the complexity degree is reduced by posterior factors), a block in which the difference $\Delta(i, j)$ is smaller than or equal to the predetermined threshold β. The reduced-complexity-degree blocks and the increased-complexity-degree blocks are distorted blocks. The distortion detector 13 determines that each block in which the difference $\Delta(i, j)$ is larger than the threshold β and is smaller than the threshold a is a block in which the part included in the fingerprint and represented therein has no distortion.

The threshold α is a positive value and is set to, for example, a value obtained by multiplying a difference ($F_{max}$-$F_{min}$) between the maximum value $F_{max}$ and the minimum value $F_{min}$ of the features of each block by 0.2 to 0.3. The threshold β is a negative value and is set to, for example, a value obtained by multiplying a difference ($F_{max}$-$F_{min}$) between the maximum value $F_{max}$ and the minimum value $F_{min}$ of the features of each block by 0.2 to 0.3.

Alternatively, the distortion detector 13 may detect, as a reduced-complexity-degree block, a block in which the ratio ($C_a(i, j)/C_p(i, j)$) of the posterior complexity degree to the prior complexity degree is smaller than or equal to a threshold Tha and may detect, as an increased-complexity-degree block, a block in which the ratio ($C_a(i, j)/C_p(i, j)$) is larger than or equal to a threshold Thb. In this case, the threshold Tha is set to a value between 0 and 1, for example, to a value of 0.6 to 0.8 and the threshold Thb is set to a value larger than 1, for example, to 1.2 to 1.6.

When any of the blocks adjacent to the reduced-complexity-degree block in question is not a reduced-complexity-degree block, the distortion detector 13 may determine that the reduced-complexity-degree block in question is an undistorted block. Similarly, when any of the blocks adjacent to the increased-complexity-degree block in question is not an increased-complexity-degree block, the distortion detector 13 may determine that the increased-complexity-degree block in question is an undistorted block. With such an arrangement, the distortion detector 13 does determine, as a distorted block, a block in which a fingerprint residue due to finger oil remaining on the sensor surface is represented or a block in which the posterior complexity degree has been increased or reduced by an influence of noise or the like.

Figure 3:
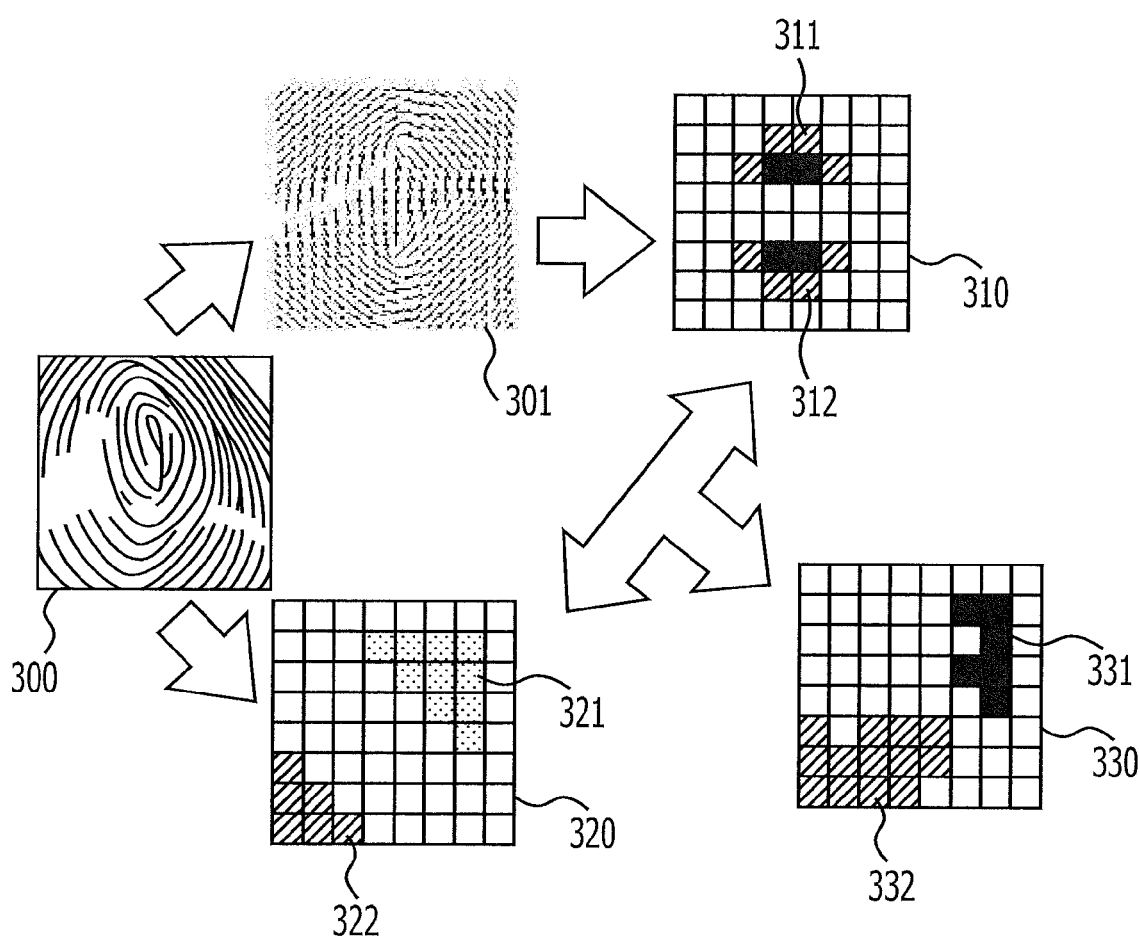
FIG. 3 illustrates an example of relationships among a biometric image representing a fingerprint, the prior complexity degrees and the posterior complexity degrees for respective blocks, and distorted blocks.

FIG. 3 illustrates an example of relationships among a biometric image representing a fingerprint, the prior complexity degrees and the posterior complexity degrees for respective blocks, and distorted blocks. In FIG. 3, ridge directions in blocks are determined from a biometric image 300 and are represented by, for example, a set of arrows 301. Each arrow of the set of arrows 301 represents a local ridge direction corresponding to the position of the arrow.

A block image 310 represents the biometric image 300 in units of blocks and also indicates the prior complexity degrees of the blocks. Each rectangle in the block image 310 corresponds to one block. In the block image 310, the higher the color density of the block is, the prior complexity degree of the block is higher.

In this example, a whorl center is represented in the vicinity of the center of the biometric image 300. Thus, the blocks included in a region 311 located slightly above the center of the image and the blocks included in a region 312 located slightly below the center of the image have relatively large changes in the ridge directions relative to the ridge directions in the adjacent blocks. Thus, the prior complexity degrees of the blocks included in the regions 311 and 312 are higher than the prior complexity degrees of the other blocks.

A block image 320 represents the biometric image 300 in units of blocks and also indicates the posterior complexity degrees of the blocks. Each rectangle in the block image 320 corresponds to one block. In the block image 320, the higher the color density of the block is, the posterior complexity degree of the block is higher.

The ridge pitch at the upper right side in the biometric image 300 is small. Thus, the features of the blocks included in a region 321 at the upper right side in the block image 320 assume relatively large values, so that the posterior complexity degrees of the blocks also increase. On the other hand, the ridge pitch at the lower left side in the block image 320 is large. Thus, the features of the blocks included in a region 322 at the lower left side in the biometric image 300 assume relatively small values, so that the posterior complexity degrees of the blocks also decrease.

A block image 330 has multiple blocks resulting from division of the biometric image 300. Each block indicates whether or not it is a distorted block. In the block image 330, the blocks included in a region 331 where the posterior complexity degrees are high relative to the prior complexity degrees are increased-complexity-degree blocks of the distorted blocks. On the other hand, the blocks included in a region 332 where the prior complexity degrees are high relative to the posterior complexity degrees are reduced-complexity-degree blocks of the distorted blocks.

Thus, the blocks in which the complexity degrees were changed by posterior factors are detected as distorted blocks.

The distortion detector 13 obtains the total number $N_{extend}$ of increased-complexity-degree blocks and the total number $N_{shrink}$ of reduced-complexity-degree blocks detected from the biometric image. When the total number $N_{extend}$ of increased-complexity-degree blocks or the total number $N_{shrink}$ of reduced-complexity-degree blocks is larger than a predetermined threshold Th, the distortion detector 13 determines that the fingerprint in the biometric image has distortion. The distortion detector 13 causes the display unit 2 to display, to the user, a message indicating that the fingerprint is to be captured again. The threshold Th may be set to a half the number of distorted blocks which is an allowable range of a comparison-accuracy decline due to distorted blocks, for example, to 10 to 20% of the total number of blocks that overlap a fingerprint region (i.e., a region representing a fingerprint) on a biometric image at least partially. Typically, the luminance values of the pixels included in a background region where no fingerprint is represented in the biometric image are considerably larger or smaller than the luminance values of the pixels included in a fingerprint region. Thus, the fingerprint region may be determined by binarization of the biometric image. For example, when the luminance values of the pixels included in a background region are smaller than the luminance values of the pixels included in a fingerprint region, the distortion detector 13 may determine the pixels that are included in the biometric image and that have larger luminance values than a predetermined binarization threshold are included in the fingerprint region. The binarization threshold may be set to a luminance value corresponding to the largest one of the luminance values of the pixels included in the background region, for example, to "10".

Upon determining that the fingerprint has distortion, the distortion detector 13 may estimate a direction in which a finger is excessively pressed, on the basis of a difference between the barycenter of the increased-complexity-degree blocks and the barycenter of the reduced-complexity-degree blocks. To this end, the distortion detector 13 obtains a vector "Direction $(=G_{shrink}-G_{extend})$" from the barycenter $G_{extend}$ of the increased-complexity-degree blocks to the barycenter $G_{shrink}$ of the reduced-complexity-degree blocks. The distortion detector 13 may cause the display unit 2 to display a message indicating that the finger is excessively pressed in the vector "Direction" direction. In conjunction with the message, the distortion detector 13 may also cause the display unit 2 to display the acquired biometric image and an image on which an arrow indicating the vector "Direction" is superimposed.

When the distance ΔG between the barycenter $G_{extend}$ of the increased-complexity-degree blocks and the barycenter $G_{shrink}$ of the reduced-complexity-degree blocks is smaller than a predetermined threshold, the distortion detector 13 may or may not cause the display unit 2 to display a message indicating that the fingerprint is to be captured again. The predetermined threshold is set to, for example, one tenth to one fifth of the horizontal width or vertical length of the fingerprint region. This is because, when the inter-barycenter distance ΔG is smaller than the threshold, a distortion in the biometric information in the biometric image is due to projections and depressions on the finger surface, and thus the possibility that the number of distorted blocks does not decrease is high even when the fingerprint is re-captured.

On the other hand, when the total number $N_{extend}$ of increased-complexity-degree blocks and the total number $N_{shrink}$ of reduced-complexity-degree blocks are smaller than or equal to the threshold Th, the distortion detector 13 determines that the influence the distortion in the fingerprint in the biometric image has on the comparison accuracy is within an allowable range. In this case, the distortion detector 13 stores the intra-biometric-image position of each distorted block and a distorted-block type (i.e., an increased-complexity-degree block or a reduced-complexity-degree block) in the storage unit 5.

When the total number $(N_{extend}+N_{shrink})$ of distorted blocks is larger than twice the threshold Th, the distortion detector 13 may determine that the fingerprint in the biometric image has distortion.

When the distortion detector 13 determines that the influence the distortion in the fingerprint in the biometric image has on the comparison accuracy is within the allowable range, the feature extractor 14 extracts features of the fingerprint from the biometric image.

The features extracted by the feature extractor 14 may include, for example, the positions of minutiae representing characteristic fingerprint structures, such as bifurcations and endings of fingerprint ridges. To this end, the feature extractor 14 may binarize the luminance values of the pixels in the biometric image to distinguish between the pixels representing ridges and the pixels representing valleys. A threshold for the binarization may be set to, for example, the average value of the luminance values of the pixels in the biometric image. With respect to the binarized biometric image, the feature extractor 14 performs thinning processing on the pixels having luminance values corresponding to ridges to thereby thin a line of coupled pixels representing the ridges into a line having, for example, a single-pixel width. The feature extractor 14 scans the thinned-line biometric image by using multiple mask patterns having binary patterns corresponding to bifurcations and endings of ridges. When a match with any of the mask patterns is found, the feature extractor 14 detects the position of the match in the biometric image. The feature extractor 14 then regards the center pixel of the detected position as a minutia and also regards a minutia type (i.e., a bifurcation or ending) represented by the matching mask pattern as the type of the detected minutia.

For extracting the minutiae from the biometric image, the feature extractor 14 may also use another known method for determining minutiae representing endings or bifurcations of ridges. In addition, the feature extractor 14 may extract the ridge directions in the blocks in the biometric image as features. In this case, the ridge direction in each block may be the block ridge direction determined by the prior-complexity-degree estimator 11.

The feature extractor 14 stores feature information in the storage unit 5 in association with the biometric image. The feature information may include features, such as the total number of extracted minutiae, the identification numbers of the minutiae, types of minutiae, the intra-biometric-image position of the minutiae, and the ridge directions. The identification numbers of the minutiae may be, for example, serial numbers assigned sequentially starting at "1" from the minutia closer to the upper left edge of the biometric image.

During the comparison, the comparator 15 determines the degree of similarity between the input biometric information, which is the fingerprint represented in the user's acquired biometric image, and the registered biometric information, which is a registered-user's fingerprint represented in a registered biometric image of the registered user identified with user identification information input via the input unit 3.

The comparator 15 uses, for example, minutia matching to determine the value of similarity. In this case, the comparator 15 aligns any of the minutiae included in the feature information with any of the minutiae extracted from the registered-biometric image. The comparator 15 determines the number of matches between other minutiae included in the feature information and the minutiae extracted from the registered biometric image. For example, when the distance between two minutiae is smaller than or equal to the inter-ridge pitch, the comparator 15 may determine that the two minutiae match each other. Only when the types of two minutiae match each other, the comparator 15 may also determine that the two minutiae match each other.

While changing the pair of minutiae to be aligned, the comparator 15 determines the number of matches of the minutiae extracted from the user's biometric image and the minutiae extracted from the registered biometric image. The comparator 15 uses, as the similarity degree, the ratio of the number of matching minutiae to the total number of minutiae extracted from the user's biometric image.

During the determination of the similarity degree, the comparator 15 may also assign a weight to each matching minutia, depending on whether or not the minutia is included in a distorted block. In this case, the comparator 15 may obtain a comparison score S in accordance with:

$$S = \sum_{k=1}^{N_m} CompareMinutiae(k) \times w_k \quad (5)$$

In this case, $N_m$ denotes the total number of minutiae extracted from the user's biometric image. CompareMinutiae(k) denotes the degree of matching of the kth one (k=1, 2, ..., $N_m$) of the minutiae extracted from the user's biometric image with the minutiae in the registered biometric image. Also, $w_k$ denotes a weighting factor set for the kth minutia.

The comparator 15 determines the comparison score S in accordance with equation (5) noted above while changing the pair of minutiae to be aligned and uses the largest value of the determined comparison scores S as the similarity degree.

When the block including the kth minutia is a distorted block, it is preferable that the weighting factor $w_k$ be set to a smaller value than the value of a case in which the block including the kth minutia is an undistorted block. Such an arrangement allows the comparator 15 to suppress a comparison-accuracy decline caused by a distortion due to finger motion or the like during fingerprint reading. For example, when the block including the kth minutia is a distorted block, the weighting factor $w_k$ is set to 0.4, and when the block including the kth minutia is an undistorted block, the weighting factor $w_k$ is set to 1.

The increased-complexity blocks are more likely to have artifacts created by a reduction in the inter-ridge pitch or a cut on the finger surface than the reduced-complexity-degree blocks. Thus, the artifacts could be erroneously detected as minutiae. Accordingly, the weighting factor $w_k$ when the block including the kth minutia is an increased-complexity-degree block may be set to a smaller value than the weighting factor $w_k$ when the block including the kth minutia is a reduced-complexity-degree block.

For example, the matching degree CompareMinutiae(k) may be "100" when any minutia in the registered biometric image matches the kth minutia extracted from the user's biometric image and may be "0" when no minutia in the registered biometric image matches the kth minutia. Alternatively, the matching degree CompareMinutiae(k) may be "100" when the type of the kth minutia extracted from the user's biometric image and the type of the matching minutia in the registered biometric image are the same and may be "50" when the types of those two minutiae are different from each other. In this case, the matching degree CompareMinutiae(k) may be "0" when no minutia in the registered biometric image matches the kth minutia.

Alternatively, for a smaller angular difference between the ridge direction in the block including the kth minutia and the ridge direction in the block including the minutia that is found in the registered biometric image and that matches the kth minutia, the comparator 15 may set a larger value for the matching degree CompareMinutiae(k). For example, when the absolute value of the angular difference between the ridge directions in two blocks is denoted by DiffDirection, the comparator 15 may set the matching degree CompareMinutiae(k) to 1/(1+DiffDirection).

Alternatively, the comparator 15 may determine the similarity degree by performing pattern matching between the user's biometric image and the registered biometric image representing the registered biometric information. In this case, the comparator 15 obtains normalized cross-correlation coefficients while changing the position of the user's biometric image relative to the position of the registered biometric image and determines the largest one of the values of the obtained normalized cross-correlation coefficients as the value of the similarity. In this case, the feature extractor 14 may be omitted.

The comparator 15 passes the similarly to the authentication determiner 16 in conjunction with the identification information of the registered user.

When the user's identification information has not been input, the comparator 15 determines the degrees of fingerprint similarity with the respective registered users. The comparator 15 then selects the registered user having the largest value of the fingerprint similarity degree.

The comparator 15 passes, to the authentication determiner 16, the largest value of the similarity degree and the identification information of the registered user corresponding to the largest value.

By comparing the similarity degree with an authentication determination threshold, the authentication determiner 16 determines whether or not the user in question is to be authenticated as the registered user. For example, when the similarity degree is higher than or equal to the authentication determination threshold, the authentication determiner 16 determines that the user's fingerprint represented in the biometric image matches the fingerprint of the registered user. Thus, the authentication determiner 16 authenticates the user as the registered user. Upon authenticating the user, the authentication determiner 16 notifies the processing unit 6 about the authentication result. The processing unit 6 then permits the authenticated user to use an apparatus equipped with the biometric authentication device 1 or an apparatus connected with the biometric authentication device 1.

On the other hand, when the similarity degree is lower than the authentication determination threshold, the authentication determiner 16 does not authenticate the user and notifies the processing unit 6 that the user is not authenticated. The processing unit 6 then does not permit the unauthorized user to use an apparatus equipped with the biometric authentication device 1 or an apparatus connected with the biometric authentication device 1. The processing unit 6 may also cause the display unit 2 to display a message indicating that the authentication failed.

It is preferable that the authentication determination threshold be set to a value at which the authentication determiner 16 succeeds in the authentication only when the user himself or herself is the registered user. It is also preferable that the authentication determination threshold be set to a value at which the authentication determiner 16 fails in the authentication when the user in question is a person other than the registered user. For example, the authentication determination threshold may have a value obtained by adding a value, obtained by multiplying a difference between the largest possible value and the smallest possible value of the similarity degree by 0.7, to the smallest value of the similarity degree.

During execution of the registration processing, when the distortion detector 13 determines that the influence the distortion in the biometric information in the biometric image has on the comparison accuracy is within the allowable range, the register 17 stores the user's identification information, input via the input unit 3, in the storage unit 5 in conjunction with the feature information extracted by the feature extractor 14. When the comparator 15 uses pattern matching to determine the similarity degree, the register 17 causes the biometric image itself or a rectangular region circumscribed around the fingerprint region in the biometric image to be stored in the storage unit 5 in conjunction with the user's identification information. As a result, the user is registered as a registered user permitted to use the apparatus equipped with the biometric authentication device 1.

Figure 4:
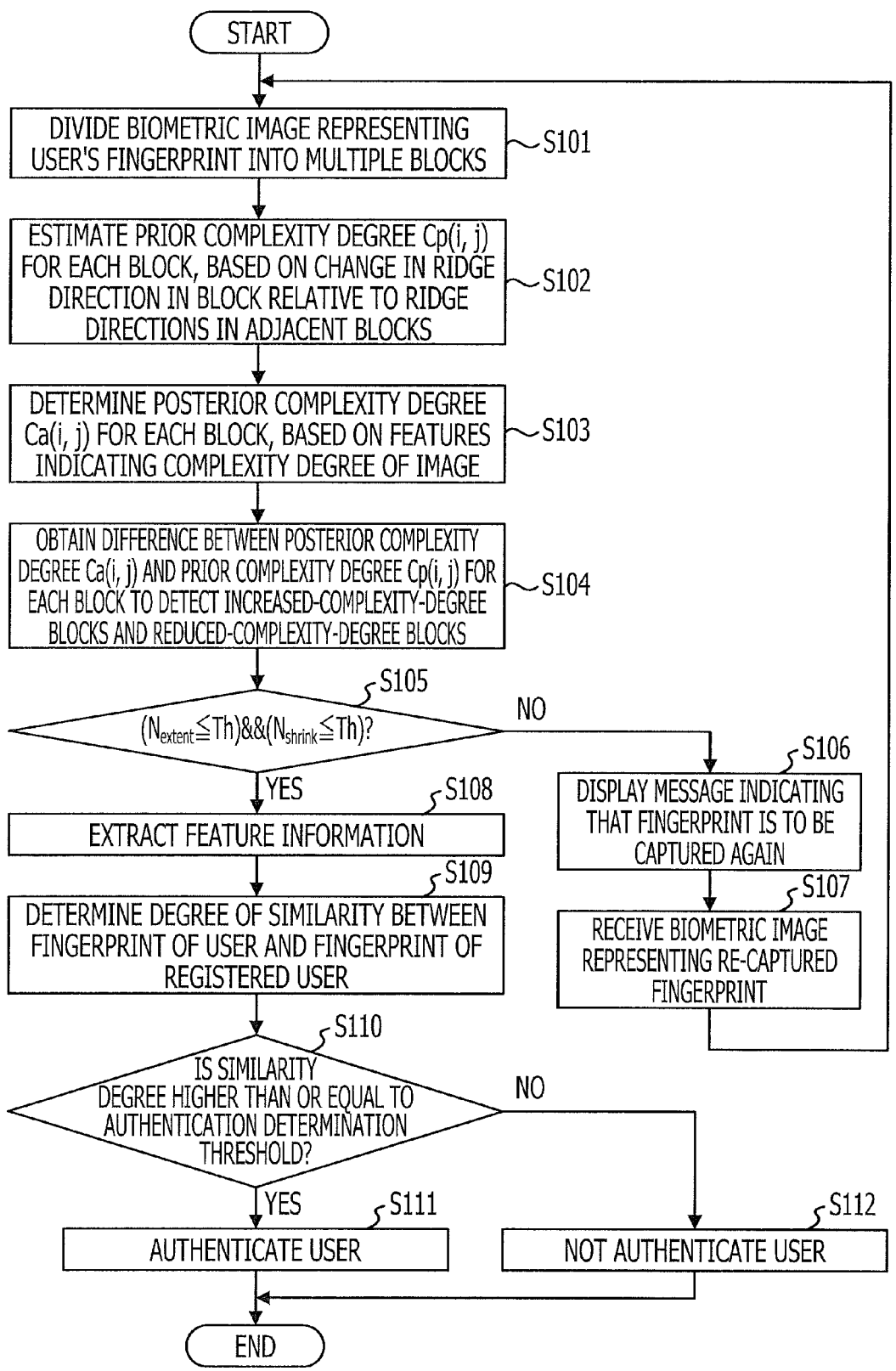
FIG. 4 is an operation flowchart illustrating biometric authentication processing.

FIG. 4 is an operation flowchart of the biometric authentication processing executed by the processing unit 6.

When the processing unit 6 receives a biometric image representing a user's fingerprint from the biometric-information acquiring unit 4, the image divider 10 in the processing unit 6 divides the biometric image into multiple blocks in step S101. In step S102, the prior-complexity-degree estimator 11 in the processing unit 6 estimates a prior complexity degree $C_p(i, j)$ for each block on the basis of changes in the ridge direction in the block relative to the ridge directions in the blocks adjacent thereto. In step S103, the posterior-complexity-degree determiner 12 in the processing unit 6 determines a posterior complexity degree $C_a(i, j)$ for each block on the basis of features indicating the complexity degree of an image represented in the block.

Subsequently, in step S104, the distortion detector 13 in the processing unit 6 obtains a difference between the posterior complexity degree $C_a(i, j)$ and the prior complexity degree $C_p(i, j)$ for each block and detects increased-complexity-degree blocks and reduced-complexity-degree blocks (which are distorted blocks) on the basis of the difference. In step S105, the distortion detector 13 determines whether or not the total number $N_{extend}$ of increased-complexity-degree blocks and the total number $N_{shrink}$ of reduced-complexity-degree blocks are smaller than or equal to the threshold Th.

When at least one of the total number $N_{extend}$ of increased-complexity-degree blocks and the total number $N_{shrink}$ of reduced-complexity-degree blocks is larger than the threshold Th (No in step S105), the distortion detector 13 determines that the fingerprint in the biometric image has distortion. In step S106, the processing unit 6 causes the display unit 2 to display a message indicating that the fingerprint is to be captured again. When a predetermined period of time (e.g., 3 to 10 seconds) passes after the message is displayed, the processing unit 6 causes the biometric-information acquiring unit 4 to re-capture the user's fingerprint. In step S107, the processing unit 6 receives a biometric image representing the re-captured fingerprint from the biometric-information acquiring unit 4. Thereafter, the processing unit 6 re-executes the processing in step S101 and the subsequent steps.

On the other hand, when both of the total number $N_{extend}$ of increased-complexity-degree blocks and the total number $N_{shrink}$ of reduced-complexity-degree blocks are smaller than or equal to the threshold Th (Yes in step S105), the process proceeds to step S108 in which the feature extractor 14 in the processing unit 6 obtains feature information representing features of the fingerprint in the biometric image. The processing unit 6 then passes the feature information to the comparator 15 in the processing unit 6. When the user's identification information has been obtained via the input unit 3, the processing unit 6 reads, from the storage unit 5, the feature information of a registered user associated with identification information that matches the obtained identification information, and passes the read feature information to the comparator 15. On the other hand, when the user's identification information has not been input, the processing unit 6 reads the feature information of all registered users from the storage unit 5 and passes the read feature information and the corresponding identification information of the registered users to the comparator 15.

In step S109, on the basis of the feature information of the user and the feature information of the registered user(s), the comparator 15 determines the degree(s) of similarity between the fingerprint of the user and the fingerprint(s) of the registered user(s). The comparator 15 passes the identification information of the registered user(s), together with the fingerprint similarity degree(s) to the authentication determiner 16 in the processing unit 6. When the user's identification number has not been obtained, the comparator 15 determines the largest value of the degrees of the user's similarities with the fingerprints of the registered users. The comparator 15 then passes, to the authentication determiner 16, the determined largest value and the identification information of the registered user corresponding to the largest value.

In step S110, the authentication determiner 16 determines whether or not the similarity degree is higher than or equal to the authentication determination threshold.

When the similarity degree is higher than or equal to the authentication determination threshold (Yes in step S110), the process proceeds to step S111 in which the authentication determiner 16 authenticates the user in question as the registered user.

On the other hand, when the similarity degree is lower than the authentication determination threshold (No in step S110), the process proceeds to step S112 in which the authentication determiner 16 does not authenticate the user in question.

After step S111 or S112, the processing unit 6 ends the biometric authentication processing. The processing unit 6 may execute steps S103 and S104 in a reversed order.

When the processing unit 6 executes the registration processing, the register 17 may execute processing for storing the feature information in the storage unit 5 in conjunction with the user's identification information, instead of the above-described processing in steps S109 to S112.

As described above, the biometric authentication device according to the present embodiment estimates, for each block, the degree of inherent complexity of the part included in the fingerprint and represented in the block, on the basis of changes in the ridge direction in the block relative to the ridge directions in adjacent ones of multiple blocks obtained by dividing a biometric image. The biometric authentication device also determines, for each block, the complexity degree of the part included in the fingerprint and represented in the block, on the basis of the features indicating a complexity degree of an image. The biometric authentication device compares, for each block, the complexity degree of the image with the estimated degree of the inherent complexity of the fingerprint to detect, as a block in which the fingerprint in the biometric image has distortion, a block in which the complexity degree is changed by posterior factors. Accordingly, the biometric authentication device can detect a distortion of a fingerprint in a biometric image without using a biometric image for reference.

Next, a description will be given of a biometric authentication device according to a second embodiment of the biometric-information processing device. During comparison processing, the biometric authentication device according to the second embodiment determines a fingerprint reference point used for aligning minutiae extracted from a biometric image of a user with minutiae extracted from a registered biometric image of a registered user. The biometric authentication device corrects the position of the reference point on the basis of a detected distorted block.

Compared with the biometric authentication device according to the first embodiment, the biometric authentication device according to the second embodiment has a difference in the function realized by the processing unit.

Hence, of elements in a processing unit included in the biometric authentication device according to the second embodiment, elements that are different from those in the processing unit in the biometric authentication device according to the first embodiment will be described below. With respect to details of the other elements in the biometric authentication device according to the second embodiment, a reference is to be made to the description of the corresponding elements in the biometric authentication device according to the first embodiment.

Figure 5:
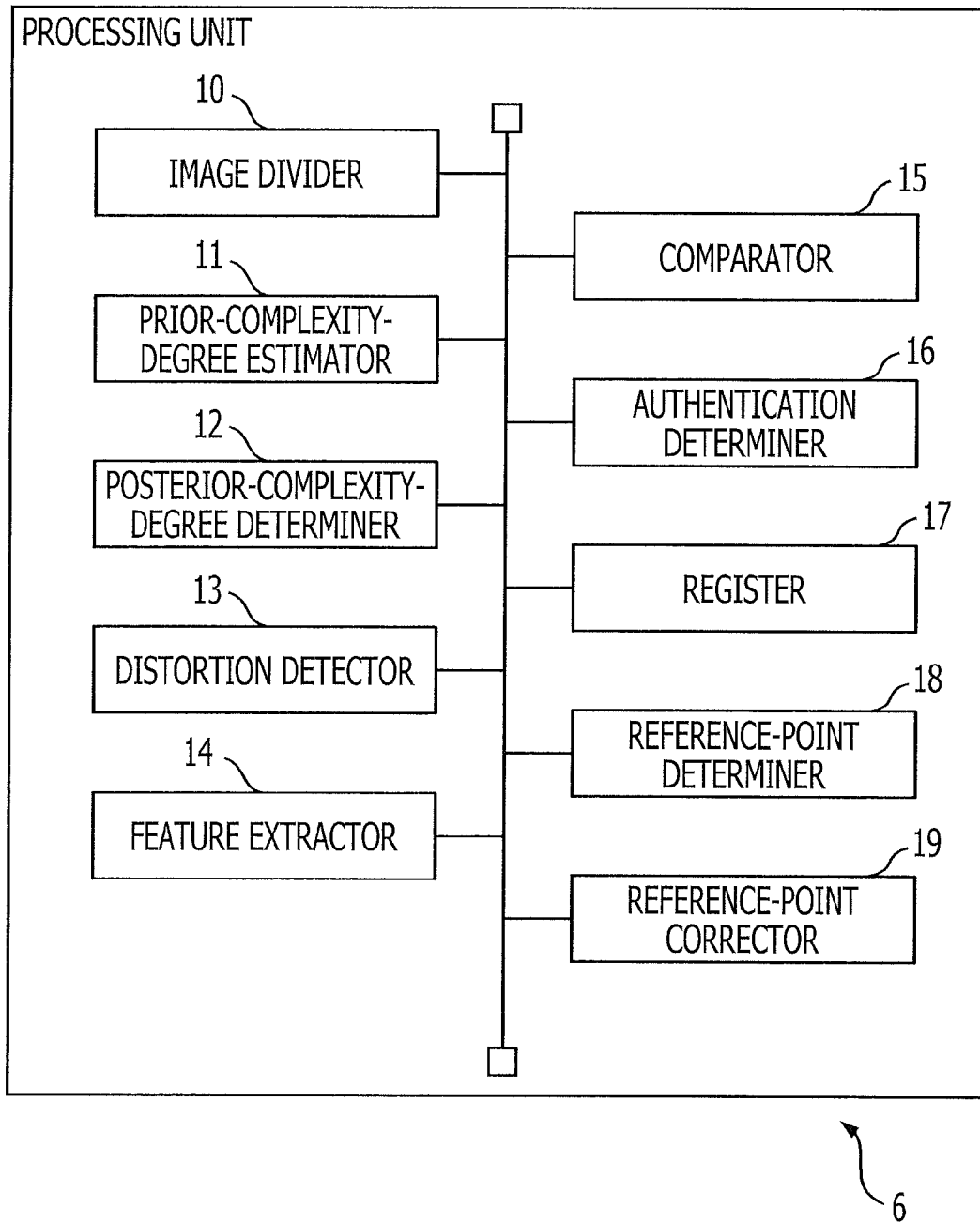
FIG. 5 is a functional block diagram of a processing unit in a second embodiment.

FIG. 5 is functional block diagram of a processing unit included in the biometric authentication device according to the second embodiment. As illustrated in FIG. 5, a processing unit 6 includes an image divider 10, a prior-complexity-degree estimator 11, a posterior-complexity-degree determiner 12, a distortion detector 13, a feature extractor 14, a comparator 15, an authentication determiner 16, a register 17, a reference-point determiner 18, and a reference-point corrector 19. Those elements included in the processing unit 6 serve as functional modules, which may be implemented by a computer program executed by a processor included in the processing unit 6. Alternatively, those elements included in the processing unit 6 may be implemented as firmware incorporated into the biometric authentication device 1.

The elements illustrated in FIG. 5 are denoted by the same reference numerals as those of the corresponding elements in the processing unit in the first embodiment illustrated in FIG. 2. The processing unit in the biometric authentication device according to the second embodiment is different from the processing unit in the biometric authentication device according to the first embodiment in that the reference-point determiner 18 and the reference-point corrector 19 are provided.

The reference-point determiner 18 determines a reference point. For example, the reference-point determiner 18 uses, as the reference point, the barycenter of a fingerprint region or the center of a block corresponding to the largest value of changes in the ridge directions relative to the adjacent blocks, the ridge directions being determined by the prior-complexity-degree estimator 11. The reference-point determiner 18 then passes the coordinates of the determined reference point to the reference-point corrector 19. For example, by using a binarization threshold corresponding to the largest one of the luminance values of the pixels included in a background region, the reference-point determiner 18 binarizes the biometric image to detect a fingerprint region, as in the case of the processing in which the distortion detector 13 detects a fingerprint region.

By moving the position of the reference point on the basis of a detected distorted block, the reference-point corrector 19 makes an intra-fingerprint position indicated by the reference point when the fingerprint represented in the biometric image has no distortion and an intra-fingerprint position indicated by the moved reference point match each other.

Figure 6A:
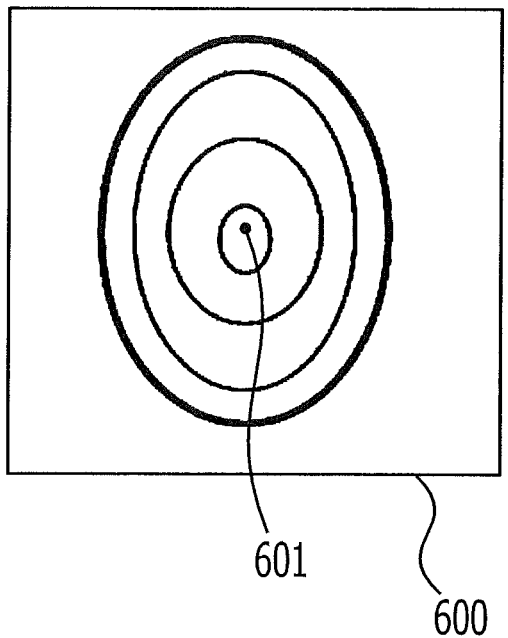
FIG. 6A is a schematic view of an undistorted fingerprint biometric image and FIG. 6B is a schematic view of a distorted fingerprint biometric image.
Figure 6B:
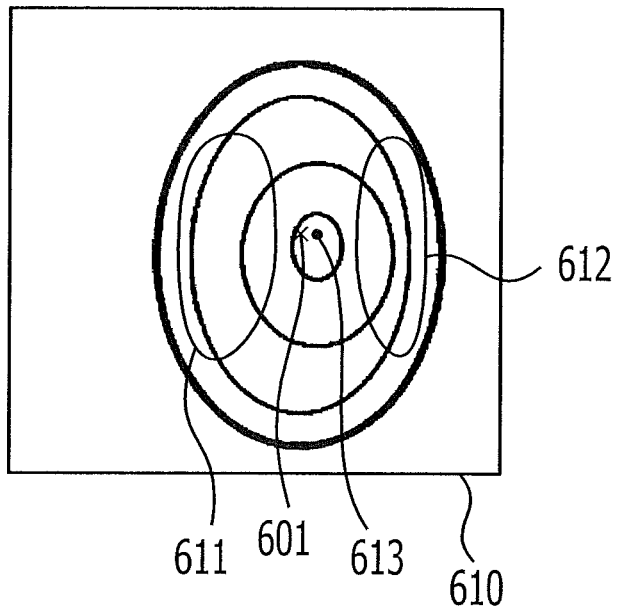

FIG. 6A is a schematic view of an undistorted fingerprint biometric image and FIG. 6B is a schematic view of a distorted fingerprint biometric image. It is assumed that, as illustrated in FIG. 6A, the reference point is set at a barycenter 601 of a fingerprint region in an undistorted fingerprint biometric image 600.

When the user excessively presses the surface of his or her finger against the sensor surface of the biometric-information acquiring unit 4, a part of the finger surface is extended and the inter-ridge pitch is increased. Conversely, the finger surface of a part other than the part of the extended finger surface is compressed by an influence of the part of the extended finger surface, and consequently, the inter-ridge pitch decreases.

Thus, as illustrated in FIG. 6B, for example, a large-ridge-pitch part 611 and a small-ridge-pitch part 612 are generated in the distorted-fingerprint biometric image 610. Consequently, a position 613 that is located in the biometric image 610 and that corresponds to the reference point 601 illustrated in FIG. 6A is displaced from the reference point 601 to a position closer to the small-ridge-pitch part 612.

The posterior complexity degrees of the blocks corresponding to the large-ridge-pitch part 611 also decrease. As a result, it is highly likely that the blocks corresponding to the large-ridge-pitch part 611 are determined to be reduced-complexity-degree blocks. On the other hand, the posterior complexity degrees of the blocks corresponding to the small-ridge-pitch part 612 increase. As a result, it is highly likely that the blocks corresponding to the small-ridge-pitch part 612 are determined to be increased-complexity-degree blocks. Thus, it is estimated that the direction in which the reference point is to be moved is a direction from the barycenter of the reduced-complexity-degree blocks to the barycenter of the increased-complexity-degree blocks.

The reference-point corrector 19 moves the reference point in the direction from the barycenter $G_{shrink}$ of all detected reduced-complexity-degree blocks to the barycenter $G_{extend}$ of all detected increased-complexity-degree blocks. Thus, a unit vector Vd in the direction in which the reference point is to be moved is given by:

$$Vd = \frac{G_{extend} - G_{shrink}}{|G_{extend} - G_{shrink}|} \qquad (6)$$

The reference-point corrector 19 also determines a movement amount ΔM of the reference point on the basis of, for example, the ratio of the total number ($N_{extend}+N_{shrink}$) of distorted blocks to the total number $N_{all}$ of blocks with respect to the biometric image, as given by equation (7) below. The movement amount ΔM is expressed for, for example, each pixel.

$$\Delta M = \frac{N_{shrink} + N_{extend}}{N_{all}} \times M_b \qquad (7)$$

where $M_b$ denotes a reference movement amount, which is, for example, the amount of change in the position of the reference point when all blocks are assumed to be distorted blocks relative to the position of the reference point when all blocks are assumed to be undistorted blocks, and is expressed for each pixel. The movement amount ΔM of the reference point is also an estimated value of the amount of distortion of the fingerprint represented in the biometric image.

The reference-point corrector 19 moves the position of the reference point in the direction of the unit vector Vd by an amount corresponding to the movement amount ΔM. The reference-point corrector 19 passes the corrected position of the reference point to the feature extractor 14.

The feature extractor 14 performs processing that is similar to the processing performed by the feature extractor 14 in the first embodiment, to thereby determine the positions of minutiae. The feature extractor 14 then expresses the positions of the extracted minutiae in a coordinate system with its origin located at the corrected reference point. The feature extractor 14 generates feature information including the positions of the minutiae and the corrected reference point and stores the feature information in the storage unit 5.

The comparator 15 aligns the minutiae extracted from the user's fingerprint represented in the biometric image and the minutiae extracted from the registered-user's fingerprint represented in the registered biometric image so that the corrected reference points match each other. With the corrected reference points being aligned, the comparator 15 obtains a comparison score in accordance with, for example, equation (5) noted above and uses the comparison score as the degree of similarity between the user's fingerprint and the registered-user's fingerprint.

According to the second embodiment, during comparison processing, the biometric authentication device aligns the minutiae extracted from the user's fingerprint on the basis of the corrected reference point and the minutiae extracted from the registered-user's fingerprint represented in the registered biometric image. Thus, the biometric authentication device can reduce the number of times the alignment is executed during the comparison processing, thus making it possible to reduce the amount of calculation for the comparison processing. In addition, the biometric authentication device corrects the position of each reference point on the basis of distorted blocks, as described above. Accordingly, even when pressure by finger motion or the like is applied to one side of a finger surface during fingerprint reading, the position of the reference point can be accurately determined and thus the corresponding minutiae can be precisely aligned during the comparison processing. The biometric authentication device, therefore, can suppress a decline in the comparison accuracy.

According to a modification of the second embodiment, the biometric-information acquiring unit 4 may have an area sensor to capture fingerprints of multiple fingers and may generate a single biometric image representing the fingerprints of the multiple fingers.

In this case, the reference-point determiner 18 determines the reference points for the respective fingers and the reference-point corrector 19 corrects the positions of the reference points for the respective fingers. In order to determine the reference points for the respective fingers, the reference-point determiner 18 divides a fingerprint region in the biometric image into regions for the respective fingers. To this end, the reference-point determiner 18 may binarize the biometric image to detect the fingerprint region, for example, as in the processing in which the distortion detector 13 detects the fingerprint region. The reference-point determiner 18 determines, for each vertical column, the frequency of the pixel values of pixels included in the fingerprint region and regards the column in which the frequency is the smallest as the boundary of two adjacent fingers. The reference-point determiner 18 then regards, as the fingerprint region of one finger, each of the fingerprint regions divided by the finger boundary.

The reference-point determiner 18 sets the barycenter of the fingerprint region for each finger as the reference point of the finger. Alternatively, the reference-point determiner 18 may determine, for each finger, blocks that overlap the fingerprint region of the finger at least partially; determine the center of, of the determined blocks, the block in which changes in the ridge direction relative to the ridge directions in the blocks adjacent thereto is the largest; and set the determined center of the block as the reference point of the finger.

The reference-point corrector 19 also determines, for each finger, the increased-complexity-degree blocks and the reduced-complexity-degree blocks of the blocks that overlap the fingerprint region of the finger at least partially. Further, in accordance with equations (6) and (7) noted above, the reference-point corrector 19 may determine, for each finger, the unit vector and the movement amount in the direction in which the reference point is to be moved. In this case, the barycenter $G_{extend}$ of the increased-complexity-degree blocks and the barycenter $G_{shrink}$ of the reduced-complexity-degree blocks in equation (6) are the barycenter of the increased-complexity-degree blocks and the barycenter of the reduced-complexity-degree blocks, respectively, of the blocks that overlap the fingerprint region of a finger of interest. $N_{all}$ in equation (7) denotes the total number of blocks that overlap the fingerprint region of the finger of interest at least partially and $N_{extend}$ and $N_{shrink}$ denote the number of increased-complexity-degree blocks and the number of reduced-complexity-degree blocks, respectively, of the blocks that overlap the fingerprint region of the finger of interest at least partially.

In addition, the feature extractor 14 may determine, as one type of features used for the comparison processing, the distance between the corrected reference points of the fingers.

Figure 7:
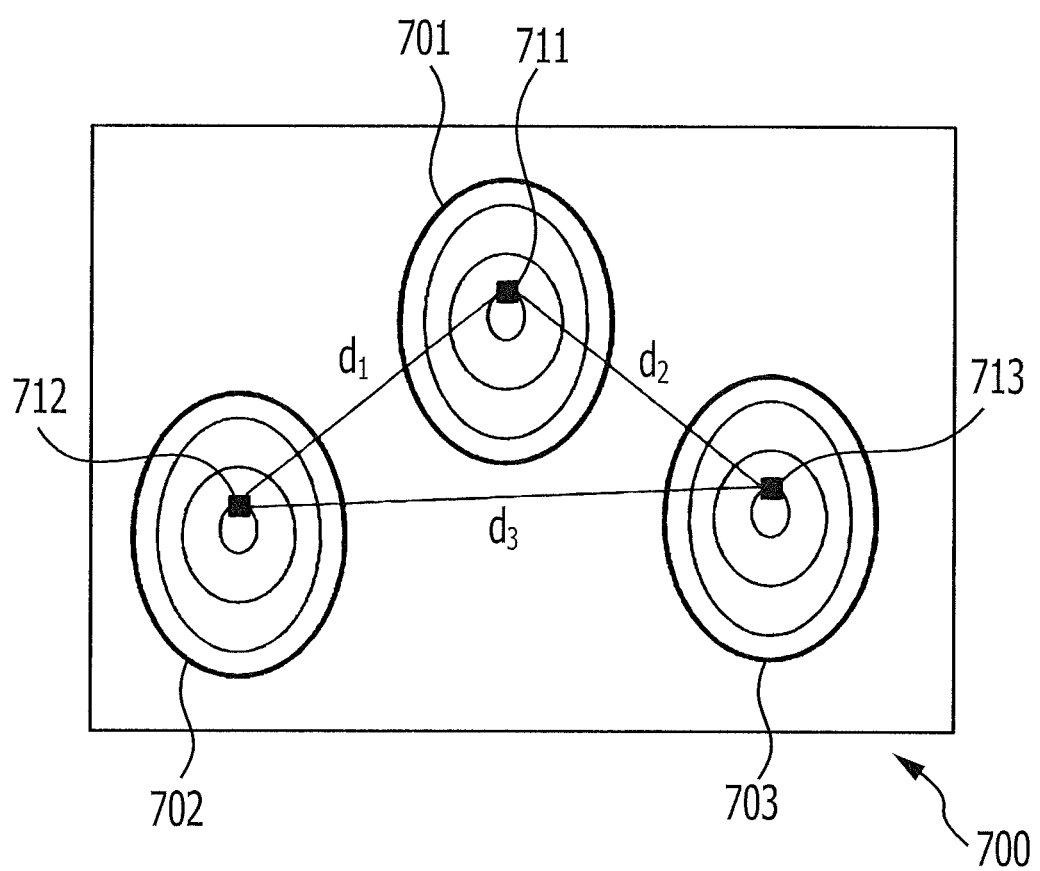
FIG. 7 is a schematic view of a biometric image representing fingerprints of multiple fingers.

FIG. 7 is a schematic view of a biometric image representing fingerprints of multiple fingers. A biometric image 700 represents fingerprints 701 to 703 of three fingers. In this case, a distance $d_1$ between a corrected reference point 711 for the fingerprint 701 and a corrected reference point 712 for the fingerprint 702 is determined as features. Similarly, a difference $d_2$ between the corrected reference point 711 and a corrected reference point 713 for the fingerprint 703 and a difference $d_3$ between the corrected reference point 712 and the corrected reference point 713 are determined as features.

According to the first embodiment and the modification of the second embodiment, the biometric-information acquiring unit 4 may have a swipe fingerprint sensor. In this case, the user swipes his or her finger in the longitudinal direction of the finger while pressing it against the sensor surface of the fingerprint sensor, so that the fingerprint sensor sequentially generates partial images representing parts of a finger. The partial images are then combined together to generate a biometric image representing the entire fingerprint.

However, if the user excessively presses his or her finger against the sensor surface, the finger surface may get stuck on the finger sensor. In such a case, since the finger surface is compressed along the direction in which the finger is moved, the ridge pitch is reduced. Consequently, the posterior complexity degrees of blocks corresponding to the part stuck on the fingerprint sensor increase. Conversely, at a part adjacent to the stuck part, the finger surface is extended, so that the ridge pitch increases. Thus, the posterior complexity degrees of the blocks corresponding to the part of the extended surface decrease. When the finger surface gets stuck on the fingerprint sensor multiple types during movement of the finger, a region including a large number of increased-complexity-degree blocks and a region including a small number of reduced-complexity-degree blocks appear alternately along the direction in which the finger is moved.

FIG. 8 illustrates one example of distribution of increased-complexity-degree blocks and reduced-complexity-degree blocks detected from a biometric image when the finger surface gets stuck on the fingerprint sensor multiple times.

A block image 800 has blocks obtained by dividing a biometric image. The vertical direction of the block image 800 corresponds to a finger moving direction. Regions 810 are regions including increased-complexity-degree blocks and regions 820 are regions including reduced-complexity-degree blocks. As illustrated in FIG. 8, the regions 810 including the increased-complexity-degree blocks and the regions 820 including the reduced-complexity-degree blocks appear in the fingerprint region 801 alternately along the direction in which the finger is moved, i.e., along the vertical direction.

Accordingly, the distortion detector 13 determines the frequency of increased-complexity-degree blocks and the frequency of reduced-complexity-degree blocks for each horizontal row of the blocks. The distortion detector 13 then determines a row in which the frequency of increased complexity-degree blocks is the largest and a row in which the frequency of reduced-complexity-degree blocks is the largest. When a row in which the frequency of increased complexity-degree blocks is the largest and a row in which the frequency of reduced-complexity-degree blocks is the largest appear alternately along the vertical direction, the distortion detector 13 causes the display unit 2 to display a message indicating that the finger is excessively pressed. Subsequently, the processing unit 6 causes the biometric-information acquiring unit 4 to read the fingerprint again.

The fingerprint sensor may also have, at two opposite sides thereof, guiding members having a longitudinal dimension parallel to the direction in which the finger is moved. In such a case, there are cases in which the user moves his or her finger while excessively pressing it against either one of the guiding members. Consequently, the fingerprint in the biometric image may be distorted.

FIG. 9A is a schematic plan view of a swipe fingerprint sensor having guiding members. FIG. 9B illustrates a cross section taken along a dotted line A in FIG. 9A. FIG. 9C is a schematic view of a biometric image when a finger is moved with the finger being aligned at substantially the center of the swipe fingerprint sensor. FIG. 9D is a schematic view of a biometric image when the finger is moved with the finger being pressed against the guiding member at the right side of the swipe fingerprint sensor.

A swipe sensor 900 has a horizontally elongated sensor surface 901 and guiding members 902 and 903 provided at two opposite ends of the sensor surface 901. The guiding members 902 and 903 are provided along a direction generally perpendicular to the longitudinal direction (i.e., the horizontal direction) of the sensor surface 901, i.e., along a vertical direction of the sensor surface 901. The guiding members 902 and 903 have upper ends at positions higher than the position of the sensor surface 901, so that a groove is formed between the guiding members 902 and 903. When the user vertically moves his or her finger between the guiding members 902 and 903, the entire fingerprint is scanned above the sensor surface 901 to thereby enable the swipe fingerprint sensor 900 to generate a biometric image representing the fingerprint.

When the user appropriately moves his or her finger, a biometric image 910 representing an undistorted fingerprint 911 is generated as illustrated in FIG. 9C. However, for example, when the user moves his or her finger while excessively pressing the right side of the finger against the guiding member 902, the right side of the finger surface is compressed to thereby reduce the ridge pitch. The left side of the finger surface, on the other hand, is extended to thereby increase the ridge pitch at the left side of the finger surface. Thus, a biometric image 920 representing a distorted fingerprint 912 is generated as illustrated in FIG. 9D. In this case, a large number of increased-complexity-degree blocks exist at the right side in the biometric image 920, whereas a large number of reduced-complexity-degree blocks exist at the left side in the biometric image 920.

The distortion detector 13 determines, for example, the direction from the barycenter $G_{shrink}$ of the reduced-complexity-degree blocks to the barycenter $G_{extend}$ of the increased-complexity-degree blocks. When the determined direction is at an angle of 45° or more with respect to the direction in which the finger is moved on the sensor surface 901 of the fingerprint sensor 900, the distortion detector 13 determines that the finger is excessively pressed against either one of the guiding members 902 and 903. The distortion detector 13 then causes the display unit 2 to display a message indicating that the finger is excessively pressed against either one of the guiding members. Subsequently, the processing unit 6 causes the biometric-information acquiring unit 4 to read the fingerprint again.

According to another modification, the posterior-complexity-degree determiner 12 may determine features and posterior complexity degrees with respect to only blocks that overlap a fingerprint region at least partially. Since such an arrangement can minimize the influence that the features determined from a region representing no fingerprint has on the posterior complexity degrees, the posterior-complexity-degree determiner 12 can more accurately evaluate the posterior complexity degree for each block. Similarly, the prior-complexity-degree estimator 11 may determine the prior complexity degrees for the blocks that overlap the fingerprint region at least partially.

In addition, the biometric-information processing device and the biometric-information processing method disclosed herein are applicable to various devices and systems that execute biometric authentication processing using a user's biometric information and pre-registered biometric information in order for the user to perform some type of operation.

Figure 10:
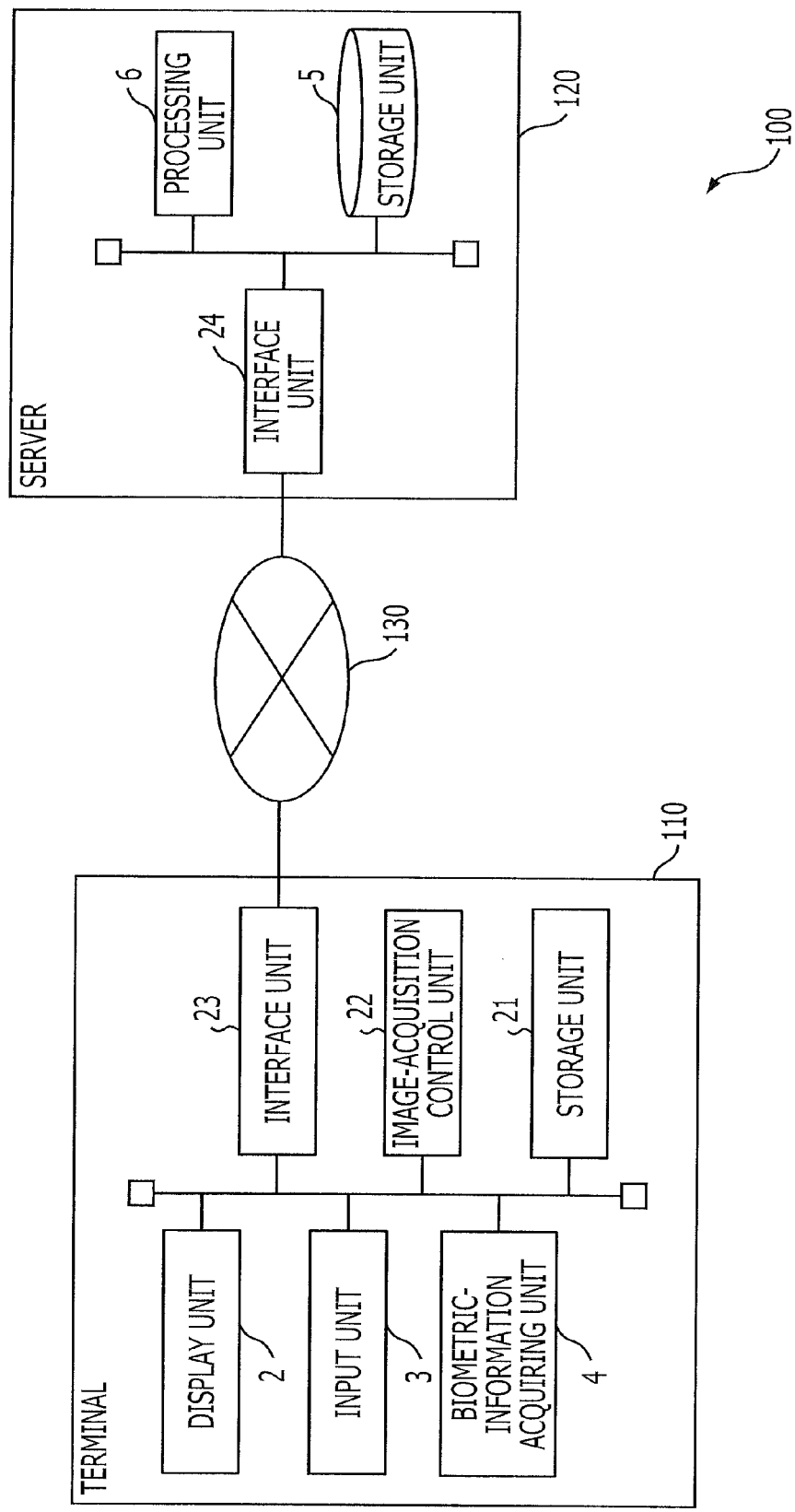
FIG. 10 is a schematic block diagram of one example of a computer system that implements the biometric-information processing device according to any of the embodiments and modifications thereof.

FIG. 10 is a schematic block diagram of one example of a computer system that implements the biometric-information processing device according to any of the embodiments and the modifications thereof.

A computer system 100 includes, for example, at least one terminal 110 and a server 120. The terminal 110 and the server 120 are interconnected through a wired or wireless communications network 130. In FIG. 10, of the elements included in the computer system 100, elements corresponding to any of the elements included in the biometric authentication device 1 illustrated in FIG. 1 are denoted by the same reference numerals as those of the elements included in the biometric authentication device 1.

In the computer system 100, the terminal 110 is, for example, a mobile terminal, such as a mobile phone or tablet terminal, or a stationary terminal. The terminal 110 has a display unit 2, an input unit 3, and a biometric-information acquiring unit 4. The terminal 110 further has a storage unit 21, an image-acquisition control unit 22, and an interface unit 23.

The storage unit 21 has, for example, a semiconductor memory circuit to temporarily store a biometric image generated by the biometric-information acquiring unit 4. The image-acquisition control unit 22 has one or multiple processors and a peripheral circuit therefor to control the units in the terminal 110 and to execute various programs that run on the terminal 110. The image-acquisition control unit 22 transmits the biometric image, generated by the biometric-information acquiring unit 4, to the server 120 via the interface unit 23, which has an interface circuit for connecting the terminal 110 to the communications network 130. The image-acquisition control unit 22 may further transmit, to the server 120, user identification information input via the input unit 3.

The server 120 has a storage unit 5, a processing unit 6, and an interface unit 24. The interface unit 24 has an interface circuit for connecting the server 120 to the communications network 130. The processing unit 6 in the server 120 realizes the functions of the processing unit 6 in any of the above-described embodiments and the modifications thereof by using the biometric image received via the interface unit 24, to thereby execute biometric authentication processing. The server 120 then transmits a determination result indicating whether or not the authentication is successful to the terminal 110 via the interface unit 24.

Alternatively, the image-acquisition control unit 22 in the terminal 110 may execute, of the functions in the processing unit in each embodiment described above, the processing of the image divider 10, the prior-complexity-degree estimator 11, the posterior-complexity-degree determiner 12, the distortion detector 13, the feature extractor 14, the reference-point determiner 18, and the reference-point corrector 19. In this case, the feature information extracted from the user's biometric image and the user's identification information may be transmitted from the terminal 110 to the server 120. On the other hand, the processing unit 6 in the server 120 executes, of the functions in the processing unit in each embodiment described above, only the processing of the comparator 15, the authentication determiner 16, and the register 17. With this arrangement, the load of the server 120 is reduced. Thus, even when a large number of biometric authentication processing operations are simultaneously executed, the computer system 100 can reduce latency for the user.

A computer program having instructions for causing a computer to realize the functions of the processing unit in each embodiment described above may be supplied in the form of a program recorded on a recording medium, such as a magnetic recording medium, an optical recording medium, or a nonvolatile semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric-information processing device comprising:
   a processor; and
   a memory which stores a plurality of instructions, which when executed by the processor, cause the processor to execute,
   generating a biometric image representing biometric information on a surface of a specific portion of a user;
   dividing the biometric image into multiple blocks;
   estimating, for each of the multiple blocks, a prior complexity degree indicating complexity of a pattern of part included in the biometric information and represented in the block, on a basis of a difference between a direction of the pattern of the part included in the biometric information and represented in the block and a direction of a pattern of other part included in the biometric information and represented in the block adjacent to that block;
   determining, for each of the multiple blocks, a posterior complexity degree indicating complexity of an image of the part included in the biometric information and represented in the block, on a basis of features indicating a complexity degree of an image represented in the block; and
   detecting the block having a difference between the posterior complexity degree and the prior complexity degree as a distorted block in which the part included in the biometric information and represented in the block has distortion, by comparing the posterior complexity degree with the prior complexity degree for each of the multiple blocks.

2. The device according to claim 1,
   wherein, with respect to the distorted blocks, the distortion detector determines a first barycenter of the blocks in which the posterior complexity degrees are smaller than the prior complexity degrees and a second barycenter of the blocks in which the posterior complexity degrees are larger than the prior complexity degrees, and estimates a direction in which the user presses the portion against the processing device, on a basis of a direction from the first barycenter to the second barycenter.

3. The device according to claim 1,
   further comprising, with respect to the distorted blocks, when at least one of the number of blocks in which the posterior complexity degrees are smaller than the prior complexity degrees and the number of blocks in which the posterity complexity degrees are larger than the prior complexity degrees is larger than a first threshold, generating the biometric image by re-capturing the biometric information of the user.

4. The device according to claim 1,
   further comprising, when the number of distorted blocks in the biometric image is larger than a second threshold, re-generating the biometric image by re-capturing the biometric information of the user.

5. The device according to claim 1, further comprising:
   storing a position of at least one first feature point in biometric information of the specific portion of a registered user, the at least one first feature point being extracted from a registered biometric image representing the biometric information of the specific portion of the registered user;
   extracting, from the biometric image, a position of at least one second feature point in the biometric information of the specific portion of the user; and
   determining a degree of similarity between the biometric information of the specific portion of the registered user and the biometric information of the specific portion of the user in accordance with a degree of matching between the at least one first feature point and the at least one second feature point,
   wherein the degree of similarity is determined by reducing a first weight for the degree of matching of the second feature point included in the distorted blocks with the first feature point to have a value smaller than a second weight for the degree of matching of the second feature point not included in the distorted blocks with the first feature point.

6. The device according to claim 2, further comprising:
    determining a reference point in the biometric information represented in the biometric image; and
    moving a position of the reference point along the direction from the first barycenter to the second barycenter to make a position included in the biometric information and indicated by the reference point when the biometric information represented in the biometric image has no distortion and a position included in the biometric information and indicated by the moved reference point match each other.

7. A biometric-information processing method comprising:
    generating a biometric image representing biometric information on a surface of a specific portion of a user;
    dividing the biometric image into multiple blocks;
    estimating, for each of the multiple blocks, a prior complexity degree indicating complexity of a pattern of part included in the biometric information and represented in the block, on a basis of a difference between a direction of the pattern of the part included in the biometric information and represented in the block and a direction of a pattern of other part included in the biometric information and represented in the block adjacent to that block;
    determining, for each of the multiple blocks, a posterior complexity degree indicating complexity of an image of the part included in the biometric information and represented in the block, on a basis of features indicating a complexity degree of an image represented in the block; and
    detecting the block having a difference between the posterior complexity degree and the prior complexity degree as a distorted block in which the part included in the biometric information and represented in the block has distortion, by comparing the posterior complexity degree with the prior complexity degree for each of the multiple blocks.

8. The method according to claim 7,
    wherein, with respect to the distorted blocks, the detecting determines a first barycenter of the blocks in which the posterior complexity degrees are smaller than the prior complexity degrees and a second barycenter of the blocks in which the posterior complexity degrees are larger than the prior complexity degrees, and estimates a direction in which the user presses the portion, on a basis of a direction from the first barycenter to the second barycenter.

9. The method according to claim 7,
    wherein, with respect to the distorted blocks, when at least one of the number of blocks in which the posterior complexity degrees are smaller than the prior complexity degrees and the number of blocks in which the posterity complexity degrees are larger than the prior complexity degrees is larger than a first threshold, the generating re-generates the biometric image by re-capturing the biometric information of the user.

10. The method according to claim 7,
    wherein, when the number of distorted blocks in the biometric image is larger than a second threshold, the generating re-generates the biometric image by re-capturing the biometric information of the user.

11. The method according to claim 7, further comprising:
    storing a position of at least one first feature point in biometric information of the specific portion of a registered user, the at least one first feature point being extracted from a registered biometric image representing the biometric information of the specific portion of the registered user;
    extracting, from the biometric image, a position of at least one second feature point in the biometric information of the specific portion of the user; and
    determining a degree of similarity between the biometric information of the specific portion of the registered user and the biometric information of the specific portion of the user in accordance with a degree of matching between the at least one first feature point and the at least one second feature point,
    wherein the determining the degree of similarity determines the degree of similarity by reducing a first weight for the degree of matching of the second feature point included in the distorted blocks with the first feature point to have a value smaller than a second weight for the degree of matching of the second feature point not included in the distorted blocks with the first feature point.

12. The method according to claim 8, further comprising:
    determining a reference point in the biometric information represented in the biometric image; and
    moving a position of the reference point along the direction from the first barycenter to the second barycenter to make a position included in the biometric information and indicated by the reference point when the biometric information represented in the biometric image has no distortion and a position included in the biometric information and indicated by the moved reference point match each other.

13. A non-transitory computer-readable storage medium storing a biometric-information processing program that causes a computer to execute a process comprising:
    dividing a biometric image representing biometric information on a surface of a specific portion of a user into multiple blocks;
    estimating, for each of the multiple blocks, a prior complexity degree indicating complexity of a pattern of part included in the biometric information and represented in the block, on a basis of a difference between a direction of the pattern of the part included in the biometric information and represented in the block and a direction of a pattern of other part included in the biometric information and represented in the block adjacent to that block;
    determining, for each of the multiple blocks, a posterior complexity degree indicating complexity of an image of the part included in the biometric information and represented in the block, on a basis of features indicating a complexity degree of an image represented in the block; and
    detecting the block having a difference between the posterior complexity degree and the prior complexity degree as a distorted block in which the part included in the biometric information and represented in the block has distortion, by comparing the posterior complexity degree with the prior complexity degree for each of the multiple blocks.

14. The computer-readable storage medium according to claim 13, further comprising:
    storing a position of at least one first feature point in biometric information of the specific portion of a registered user, the at least one first feature point being extracted from a registered biometric image representing the biometric information of the specific portion of the registered user;

extracting, from the biometric image, a position of at least one second feature point in the biometric information of the specific portion of the user; and determining a degree of similarity between the biometric information of the specific portion of the registered user and the biometric information of the specific portion of the user in accordance with a degree of matching between the at least one first feature point and the at least one second feature point, wherein the determining the degree of similarity determines the degree of similarity by reducing a first weight for the degree of matching of the second feature point included in the distorted blocks with the first feature point to have a value smaller than a second weight for the degree of matching of the second feature point not included in the distorted blocks with the first feature point.

15. The computer-readable storage medium according to claim 13, further comprising:

determining a reference point in the biometric information represented in the biometric image; and moving a position of the reference point along the direction from the first barycenter to the second barycenter to make a position included in the biometric information and indicated by the reference point when the biometric information represented in the biometric image has no distortion and a position included in the biometric information and indicated by the moved reference point match each other.

* * * * *